US011500468B1

(12) United States Patent
Gruben et al.

(10) Patent No.: US 11,500,468 B1
(45) Date of Patent: Nov. 15, 2022

(54) EXTENDED REALITY SYNCHRONIZATION KIT INCLUDING A REMOVABLE SMART INSOLE AND A HEADSET

(71) Applicant: Zero Point Energy Inc., Brooklyn, NY (US)

(72) Inventors: Jacob Yasha Gruben, Brooklyn, NY (US); Maral Kalinian, San Juan Capistrano, CA (US)

(73) Assignee: Zero Point Energy Inc., Los Angeles, CA (US)

( * ) Notice: Subject to any disclaimer, the term of this patent is extended or adjusted under 35 U.S.C. 154(b) by 0 days.

(21) Appl. No.: 17/408,457

(22) Filed: Aug. 22, 2021

(51) Int. Cl.
| | |
|---|---|
| *G06F 3/01* | (2006.01) |
| *G06T 19/00* | (2011.01) |
| *G01P 13/00* | (2006.01) |
| *G06F 3/16* | (2006.01) |
| *H02J 7/00* | (2006.01) |

(52) U.S. Cl.
CPC ............ *G06F 3/016* (2013.01); *G01P 13/00* (2013.01); *G06F 3/011* (2013.01); *G06F 3/165* (2013.01); *G06T 19/006* (2013.01); *H02J 7/0068* (2013.01)

(58) Field of Classification Search
None
See application file for complete search history.

(56) References Cited

U.S. PATENT DOCUMENTS

| | | | |
|---|---|---|---|
| 10,147,010 B2 | 12/2018 | Li | |
| 10,157,503 B2 | 12/2018 | Tran et al. | |
| 10,793,693 B2 | 10/2020 | Farris et al. | |
| 10,993,497 B2 | 5/2021 | Gaba | |
| 11,033,073 B2 | 6/2021 | Luedecke et al. | |
| 2002/0089506 A1* | 7/2002 | Templeman | G06F 3/012 345/473 |

(Continued)

FOREIGN PATENT DOCUMENTS

| | | | |
|---|---|---|---|
| KR | 20110049293 A | * | 5/2011 |
| KR | 101853295 B1 | * | 4/2018 |

OTHER PUBLICATIONS

Branthwaite, Helen, et al., "Surface Electromyography of the Foot: A Protocol for Sensor Placement," https://www.sciencedirect.com/science/article/abs/pii/S0958259219300781, The Foot, vol. 41, Dec. 2019, p. 24-29, printed on Jun. 28, 2021.

*Primary Examiner* — Kirk W Hermann
(74) *Attorney, Agent, or Firm* — Patent Ingenuity, P.C.; Samuel K. Simpson

(57) ABSTRACT

An extended reality apparatus kit has an extended reality headset configured to provide an extended reality experience for a user. The extended reality headset has a display device adapted to be worn on a head of the user. Furthermore, the headset processor is in operable communication with the display device. The headset processor generates virtual data for the extended reality experience. Additionally, the extended reality apparatus kit has a removable smart insole that is adapted for positioning within a plurality of distinct footwear apparatuses. The removable smart insole has one or more sensory feedback devices, one or more motion-based sensors, a transmitter, a receiver, and a smart insole processor. The receiver is configured to directly receive extended reality data associated with the extended reality experience from the extended reality headset in at least substantially real-time.

18 Claims, 12 Drawing Sheets

(56) References Cited

U.S. PATENT DOCUMENTS

| | | | | |
|---|---|---|---|---|
| 2009/0278707 A1* | 11/2009 | Biggins | ............... | A43B 3/34 |
| | | | | 36/25 R |
| 2017/0208890 A1* | 7/2017 | Torvinen | ............... | H02N 2/181 |
| 2018/0253906 A1* | 9/2018 | Tran | ............... | G06V 40/103 |
| 2020/0253320 A1* | 8/2020 | Guard | ............... | G06F 1/163 |
| 2021/0405755 A1* | 12/2021 | Inagaki | ............... | G05D 23/1917 |

\* cited by examiner

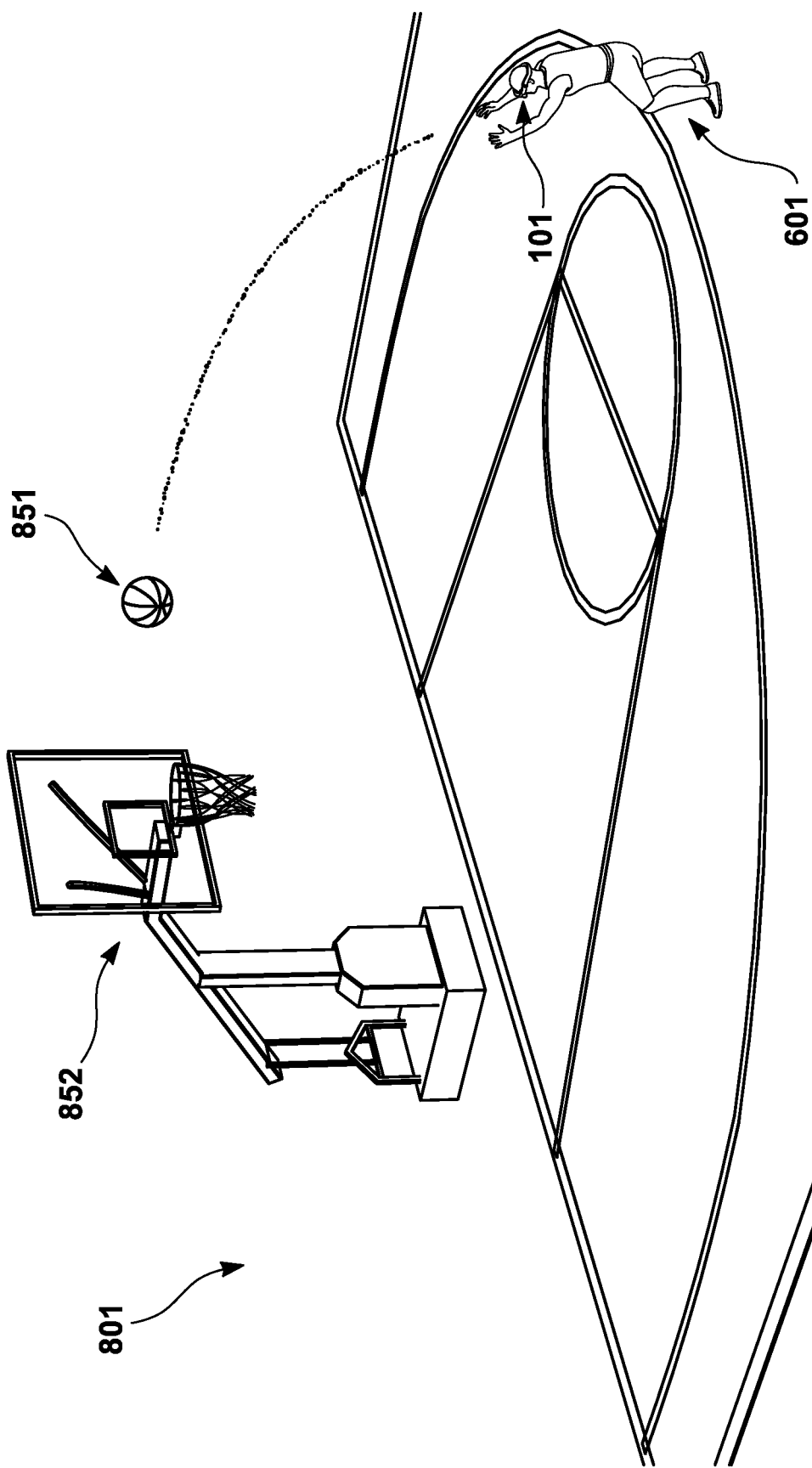

EXTENDED REALITY SYNCHRONIZATION KIT INCLUDING A REMOVABLE SMART INSOLE AND A HEADSET

BACKGROUND

1. Field

This disclosure generally relates to extended reality configurations. More particularly, the disclosure relates to an extended reality apparatus kit that has an extended reality headset and a removable smart insole.

2. General Background

Extended reality generally encompasses the spectrum of possible ways in which a configuration may incorporate different real-world and virtual world features. At one end of that spectrum is a virtual reality configuration. In such a configuration, a user is immersed fully in a virtual world experience—so much so that he or she often has to be mindful of potential real-world physical movements that may pose a physical danger. For example, a user may wear a head-mounted display device ("HMD") that renders a virtual reality experience. Because in typical virtual reality configurations the real-world vision of the user is fully obstructed, the user makes physical gesticulations (e.g., head movements, limb movements, joint articulations, etc.) to move throughout the virtual world without any discernment of potential collisions with objects in the real world. Accordingly, extended reality configurations categorized as virtual reality may provide for immersive experiences that are quite visually appealing from a virtual rendering perspective but are quite restrictive with respect to permissible movements—for safety purposes.

Toward the middle of the extended reality spectrum is what is referred to as a mixed reality configuration. In essence, this configuration has a blend of virtual and real-world features. For instance, a mixed reality HMD will typically have a clear display (analogous to glasses) that allows the user to concurrently view real-world objects in conjunction with virtual features that are overlaid over other portions of the real-world viewing experience (e.g., other real-world objects, scenery, etc.). The mixed reality HMD allows for a blended experience—one in which a user may enjoy a relatively similar amount of virtual features to that of real-world features.

Finally, toward the other end of the extended reality spectrum is the augmented reality configuration. In contrast with its counterparts, the augmented reality configuration is centered around a real-world experience with virtual features playing more of an ancillary role. For example, an HMD providing an augmented reality experience may be used by a user to perform tasks as would be normally performed by that user on a daily basis—whether that be working, playing sports, etc. In addition, the HMD may generate additional features to augment (in a related or unrelated way) the real-world experience. For example, the HMD may render visual data (e.g., a popup with geographical information) pertaining to the given real world experience (e.g., a real-world object being viewed by the user). As another example, the HMD may render visual data (e.g., an email message) that is not particularly pertinent to the user experience at hand (e.g., working out), but is helpful in allowing the user to multi-task.

What all of the foregoing extended reality configurations lack is situational awareness in both the virtual and real-world for a given feature. In essence, conventional extended reality configurations compromise the rendering of one feature in one context vis-à-vis rendering of another similarly located feature that is located in the other context. For example, a user may typically be able to view a real-world physical object, yet a virtual reality configuration would completely block out such viewing for the sake of an immersive experience in the virtual world. The user, in essence, loses awareness of what is happening in the real-world, and specifically cannot view an object that would typically be in his or her purview. As another example, in a mixed reality configuration, the user will have a significant portion of the real-world experience blocked out. And for those real-world objects that are blocked out in favor of digital features, the user again loses awareness as to those real-world objects. As a final example, an augmented reality configuration is so centered around the real-world experience that virtual features that could have been added are often left out.

As a result, conventional extended reality configurations have a common theme of favoring one context over the other (e.g., real-world over virtual or vice versa). The choice of which type of extended reality configuration to use simply amounts to a sliding scale decision as to which type of context is more favorable to a user than another. Yet, such a conventional approach unduly restricts the potential for a user to experience the potential benefits of features from different contexts.

SUMMARY

In one embodiment, an extended reality apparatus kit has an extended reality headset configured to provide an extended reality experience for a user. The extended reality headset has a display device adapted to be worn on a head of the user. Furthermore, the headset processor is in operable communication with the display device. The headset processor generates virtual data for the extended reality experience.

Additionally, the extended reality apparatus kit has a removable smart insole that is adapted for positioning within a plurality of distinct footwear apparatuses. The removable smart insole has one or more sensory feedback devices, one or more motion-based sensors, a transmitter, a receiver, and a smart insole processor. The receiver is configured to directly receive extended reality data associated with the extended reality experience from the extended reality headset in at least substantially real-time.

The smart insole processor determines a real-world stimulus corresponding to the extended reality experience, calculates one or more motion-based measurements of the removable smart insole, via the one or more motion-based sensors, that substantially coincides with the extended reality experience, generates a sensory feedback, via the one or more sensory feedback devices, based on the real-world stimulus, generates a real-world motion input based on the one or more motion-based measurements, and directly transmits, via the transmitter, the real-world motion input to the extended reality headset for an adaptation of the extended reality experience rendered by the extended reality headset.

In another embodiment, the smart insole processor determines a real-world stimulus corresponding to the extended reality experience, and generates a sensory feedback, via the one or more sensory feedback devices, based on the real-world stimulus.

In yet another embodiment, the smart insole processor calculates one or more motion-based measurements of the removable smart insole, via the one or more motion-based sensors, that substantially coincides with the extended reality experience, generates a real-world motion input based on the one or more motion-based measurements, and directly transmits, via the transmitter, the real-world motion input to the extended reality headset for an adaptation of the extended reality experience rendered by the extended reality headset.

In another embodiment, a computer program product comprises a non-transitory computer useable storage device that has a computer readable program. When executed on a computer, the computer readable program causes the computer to perform the functionality of the either, or both, of the headset processor and the smart insole processor.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 8 illustrates the user utilizing the extended reality synchronization kit in a real-world environment, such as a real-world basketball court.

DETAILED DESCRIPTION

An extended reality apparatus kit is provided to allow a user to simultaneously experience virtual world features and real-world features. In particular, the extended reality apparatus kit allows the user to avoid sacrificing an experience from one context in favor of another. Whether it be a virtual reality experience, mixed reality experience, or augmented reality experience, the extended reality apparatus kit provides situational awareness to the user for a feature both in a real-world context and a virtual world context. The universality of the extended reality apparatus kit allows a user to potentially use the same hardware (with potential modifications via interchangeable components) for multiple different types of contexts.

Figure 1:
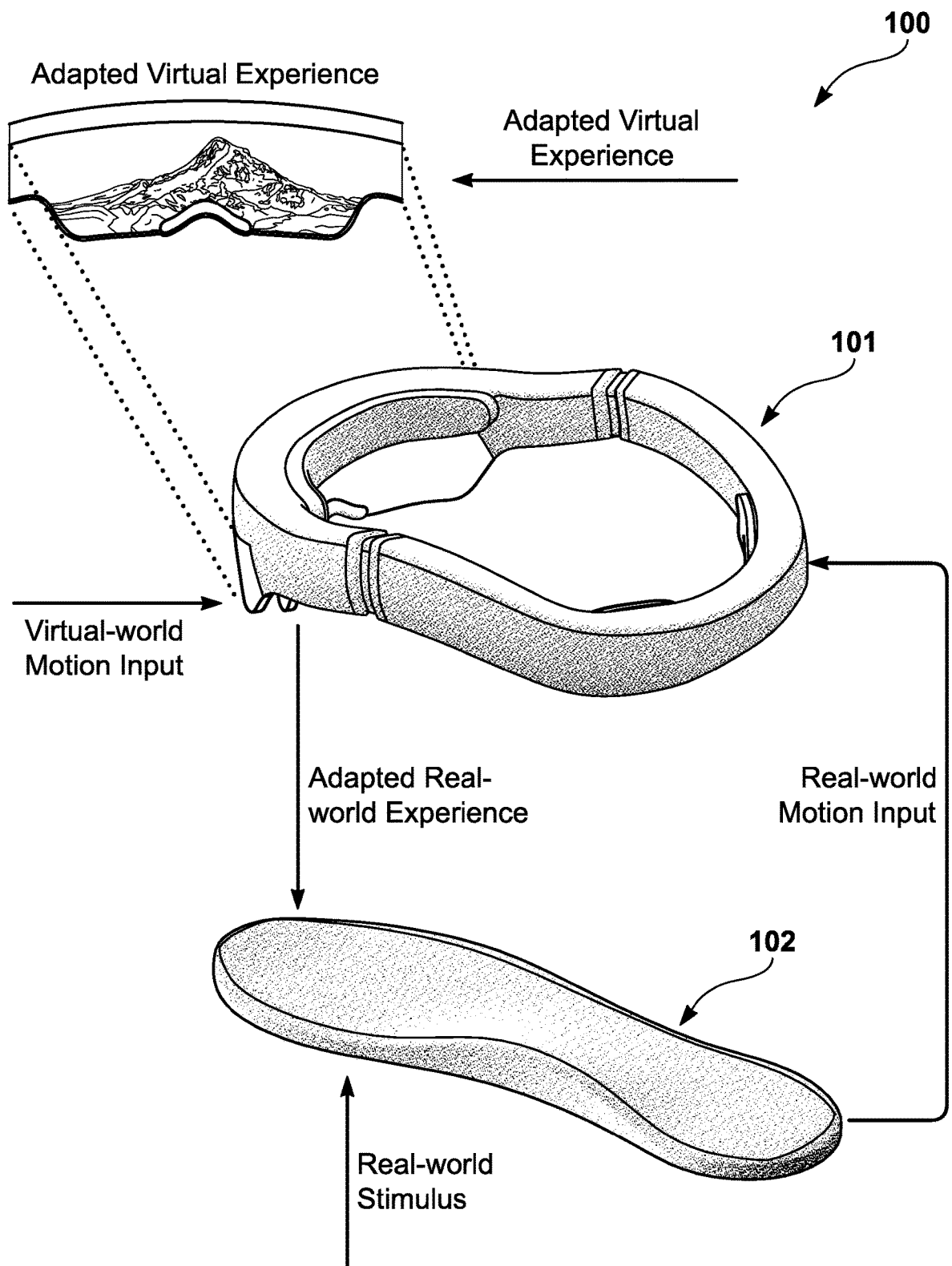
FIG. 1 illustrates an extended reality synchronization kit, which includes an HMD and a removable smart insole.

As illustrated in FIG. 1, an extended reality synchronization kit 100 includes an HMD 101 (e.g., virtual reality headset, augmented reality glasses, augmented reality eyewear, or the like) and a removable smart insole 102. In essence, the HMD 101 and the removable smart insole 102 communicate via a feedback loop. The removable smart insole 102 may determine a real-world stimulus corresponding to an extended reality experience that is also being rendered by the HMD 101, but possibly from a different context.

In one embodiment, the smart insole 102 measures various types of real-world stimuli corresponding to different forms of motion and forces performed by, or exerted on, the removable smart insole 102. For example, the smart insole 102 may determine acceleration, speed, force, strain, etc. Concurrently, with the rendering of the extended reality experience by the HMD 101, the smart insole 102 determines what is occurring in the real-world world. For instance, while the HMD 101 may be programmed to render a particular extended reality experience, that experience in isolation does not provide any feedback as to motion and forces applied to the user's lower extremities in the real-world. In essence, the extended reality synchronization kit 100 synchronizes the virtual experience with what is occurring in real-time (defined as a humanly imperceptible delay), or substantially real-time (defined as a humanly acceptable delay), in proximity to the foot of a user; such synchronization involves an adaptation of the virtual experience to coincide with forces and motions occurring in the real-world. For example, the smart insole 102 may determine that the user is striking the surface of the ground with a certain force during a run, which allows the HMD 101 to adjust the visual presentation to coincide with such movement. As another example, the smart insole 102 may determine the terrain on which the user is moving, and allow the HMD 101 to adjust the visual rendering accordingly (e.g., the visual rendering may be adapted to display a rough terrain as opposed to a smooth terrain).

Furthermore, in one embodiment, the HMD 101 may determine various virtual features that will correspond with real-world sensory feedback received by the smart insole 102. For example, if the HMD 101 determines that a virtual ball was kicked by the user within the virtual world, the HMD 101 may send a sensory feedback to the smart insole 102 so that the smart insole 102 provides a real-world sensory feedback (e.g., vibration, audio emission, light emission) in proximity to the foot of the user concurrently with the virtual feature.

In other words, the extended reality synchronization kit 100 provides a synchronized feedback loop that continuously, or continuously in part, enhances different contexts of the extended reality immersive experience based on occurrences in the other context. This symbiotic relationship allows the real-world stimuli to enhance virtual features, and virtual features to enhanced real-world sensory feedback. The aggregate effect of such enhancements allows for an enhanced immersive experience where the sum of such enhancements is greater than each of the individual enhancements in isolation.

Furthermore, the extended reality synchronization kit 100 allows the user to experience sensory feedback even when one context is potentially obstructed. For example, the user may not be able view his or her foot when the HMD 101 renders a virtual experience, but will be able to have real-world sensory output based on the smart insole 102.

Although the extended reality synchronization kit 100 has been exemplified with respect to a two-way synchronized feedback loop, in another embodiment, only one-way communication is provided. For example, the HMD 101 may provide virtual-world motion/force input to the smart insole 102, without the smart insole 102 providing real-world motion/force input to HMD 101, to adapt the real-world experience. As another example, the smart insole 102 may provide real-world motion/force input to the HMD 101 to adapt the virtual experience, without the HMD 101 providing virtual motion/force input to the smart insole 102.

Furthermore, although the HMD 101 is illustrated as an augmented reality or mixed reality headset, a virtual reality headset may be used instead. In one embodiment, the HMD 101 is a universal headset that may provide for all of virtual reality, mixed reality, and augmented reality experiences. For instance, the display device may be interchanged via various kit component display devices to allow for different experiences. Alternatively, the display device may be converted into another type of display device for a different context. For example, a virtual reality display device may be adjusted upward to allow for viewing by a transparent augment reality or mixed reality display device situated in front of or behind the virtual reality display device.

Additionally, the smart insole 102 is illustrated as a removable insole to allow it to be placed in a variety of different types of shoes. In other words, the user can reuse the smart insole for different shoes without having to repurchase a new pair of shoes having the smart insoles 102. In an alternative embodiment, the smart insole 102 is not removable, and is positioned in a static manner within a particular shoe. The smart insole 102 may be made from a variety of materials, such as fabric, rubber, or the like.

Figure 2:
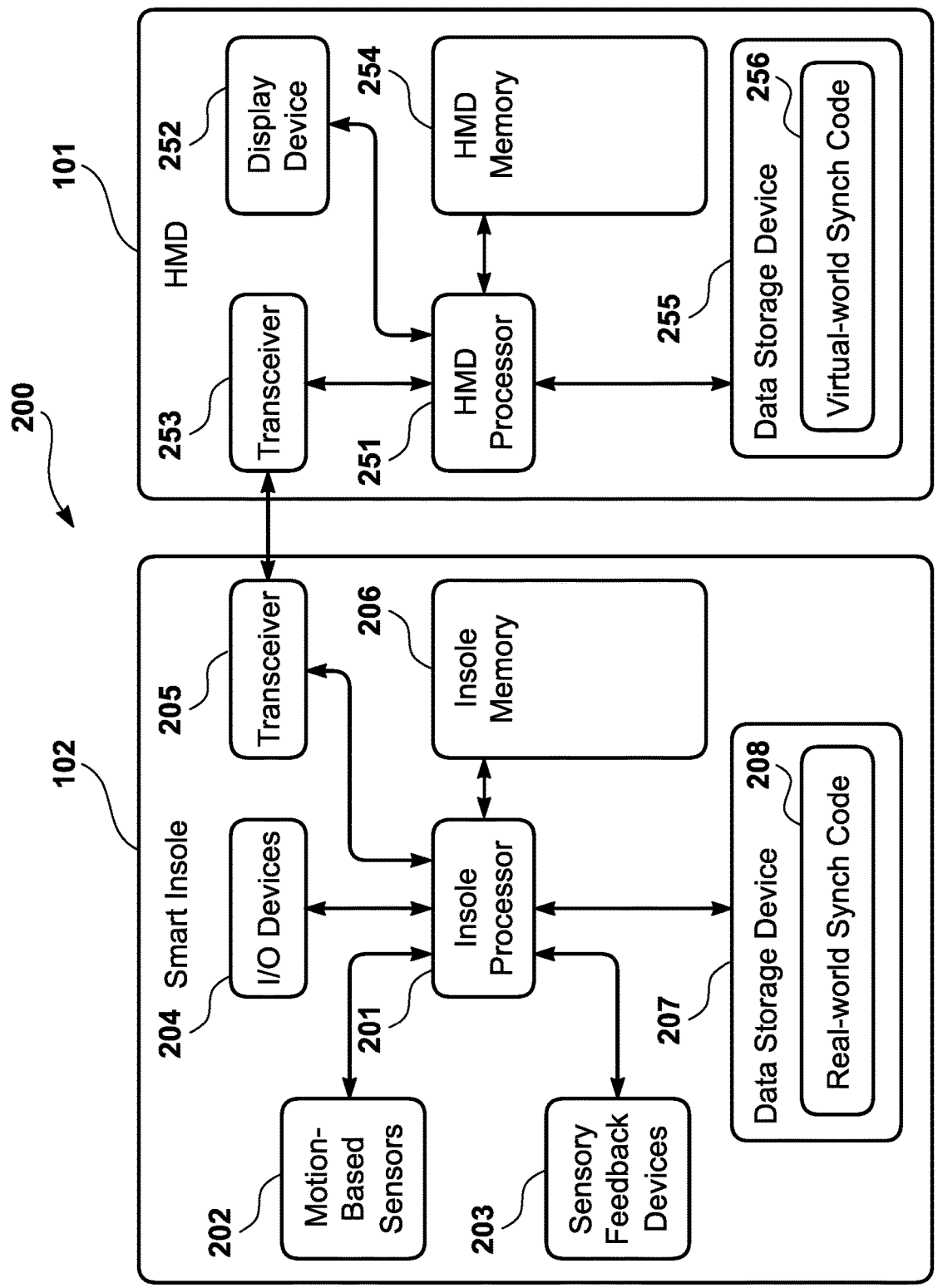
FIG. 2 illustrates a hardware configuration that may be utilized to implement the extended reality synchronization kit illustrated in FIG. 1.

FIG. 2 illustrates a hardware configuration 200 that may be utilized to implement the extended reality synchronization kit 100 illustrated in FIG. 1. The hardware configuration 200 includes the smart insole 102, which has an insole processor 201 that may perform operations by executing code stored in an insole memory device 206. As an example, the smart insole 102 may have a data storage device 207 that stores real-world synchronization code 208, which may be used to synchronize a real-world experience based upon virtual features received from the HMD 101. Furthermore, the smart insole 102 has one or more motion-based sensors 202 that detect motion specifically performed by, or exerted on or in proximity to (e.g., the shoe itself), the smart insole 102. Examples of such motion-based sensors 202 include, but are not limited to, accelerometers, gyroscopes, speed sensors, strain gauges, differential encoders (measuring differentiated velocity data of the smart insole 102), position sensors (measuring a position of the smart insole 102), and the like. In another embodiment, such sensors 202 may also include force-based sensors that determine force generated by, or exerted on, the smart insole 102. Since such sensors 202 are more often closely positioned to the area of motion and/or force generation (i.e., the foot) than the HMD 101, the smart insole 102 is able to more accurately measure motions and forces for use in the overall extended reality experience. For example, the insole processor 201 may use such data to analyze footstep patterns, speed, intensity, force, etc. Conversely, the insole processor 102 has one or more sensory feedback devices 203 that may be used to emit one or more forms of sensory feedback (e.g., haptic vibrations, light emissions, audio emissions, etc.).

In particular, the insole processor 201 may perform a process that determines a real-world stimulus corresponding to an extended reality experience. The process may calculate one or more motion-based measurements of the smart insole 201, via the one or more motion-based sensors 202, that substantially coincides with the extended reality experience. Also, the process generates a sensory feedback, via the one or more sensory feedback devices 203, based on the real-world stimulus. The process also generates a real-world motion input based on the one or more motion-based measurements. Finally, the process directly transmits, via a transmitter, the real-world motion input to HMD 101 for an adaptation of the extended reality experience rendered by the HMD 101.

Additionally, the insole processor 102 has a transceiver 205 that may be used to allow the smart insole 102 to wirelessly communicate, through one or more wireless communication protocols, with the HMD 101. (Alternatively, the transceiver 205 may include a separate transmitter and receiver.) In another embodiment, the transceiver 205 is used to communicate with a server, which indirectly communicates with the HMD 101 for the smart insole 102 in a cloud-based configuration. In yet another embodiment, a wired configuration may be utilized for communication between the smart insole 102 and the HMD 101.

Finally, the smart insole 102 may have one or more input/output ("I/O") devices 204 that may be utilized to provide input and/or output. For example, the I/O devices 204 may be one or more haptic vibration devices, audio emission devices, light emission devices, or the like.

The hardware configuration 200 also includes the HMD 101, which has an HMD processor 251 that that may perform operations by executing code stored in an HMD memory device 254. As an example, the HMD 101 may have a data storage device 255 that stores virtual-world synchronization code 256, which may be used to synchronize a virtual world experience based upon real-world features from the smart insole 102. The HMD 101 also has a display device 252, which may include a display screen, glasses, or the like in conjunction with one or more light emission devices (e.g., projectors, light emitting diodes, etc.). In addition, the HMD 101 may have I/O devices that are used in addition to the display device 252; such I/O devices may provide various sensory feedback. For example, the I/O devices may emit a haptic vibration that corresponds to a virtual feature present in the virtual experience.

Figure 3A:
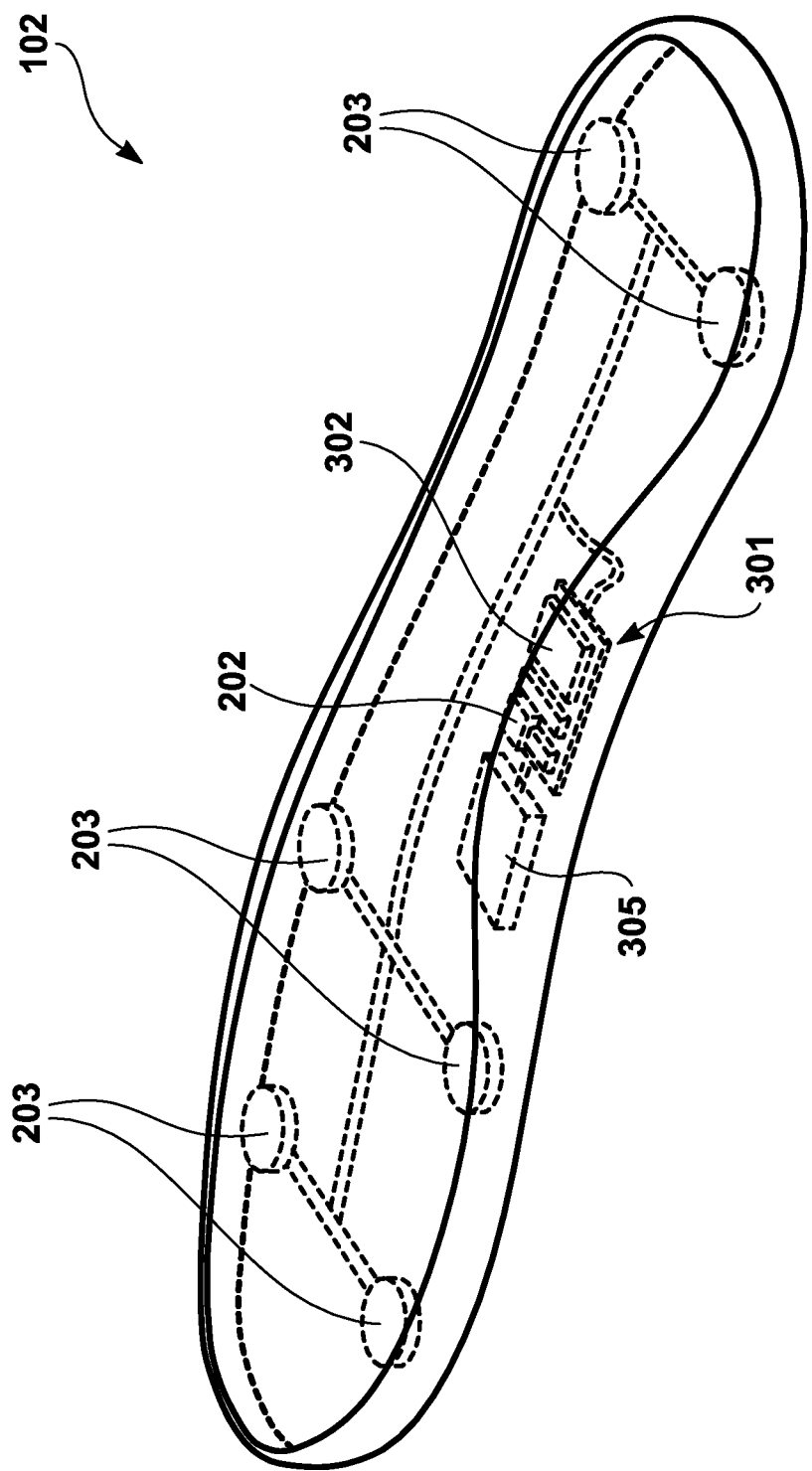
FIG. 3A illustrates an internal view of the smart insole having multiple sensory feedback devices.
Figure 3B:
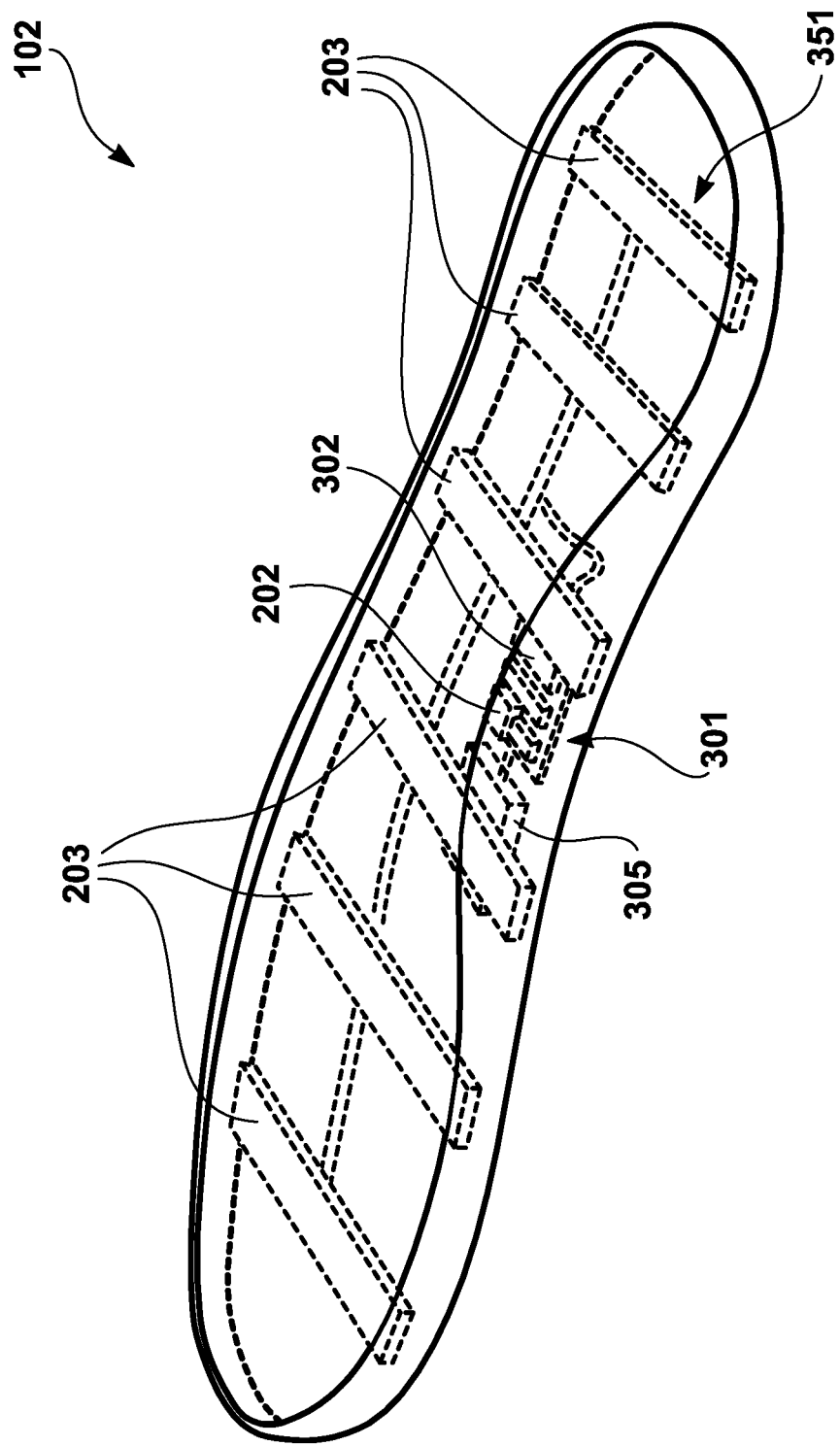
FIG. 3B illustrates a sensory feedback mat positioned within the smart insole.

FIGS. 3A and 3B illustrate various internal configurations of the smart insole 102. FIG. 3A illustrates an internal view of the smart insole 102 having multiple sensory feedback devices 203. In particular, the smart insole 301 may have a chipset 301 integrated therein. For instance, the chipset 301 may have the insole processor 302 and the motion-based sensors 202 (force-based sensors may be used in addition or in the alternative) embedded thereon. Alternatively, the chipset 301 may only have the insole processor 302, and the motion-based sensors 202 may be positioned within, or attached to, various other portions of the smart insole 102. Additionally, the smart insole 102 may have one or more sensory feedback devices 203 that are positioned at different postions to emit sensory feedback corresponding to a part of the foot of the user based on the real-world stimulus and/or a virtual world feature. For example, if a user is kicking a virtual ball with the inside portion of his or her foot, an inner, as opposed to outer, sensory feedback device 203 may provide a haptic vibration or other form sensory output. The positioning of the various components (e.g., processor, sensors, etc.) is illustrated only for exemplary purposes. Different quantities of components, types of components, and positions of components may be used other than those illustrated in the accompanying drawings.

Additionally, in another embodiment the smart insole 102 may have an integrated rechargeable power assembly 305 that is at least partially recharged by via electrical energy generated from force, applied to the removable smart insole 102, that is converted to the electrical energy. For example, a piezoelectric device may be used as a force-to-energy conversion device that fully, or partially in conjunction with another form of electric charging, powers a rechargeable battery. (Additionally, or alternatively, rechargeable power assemblies may be utilized in the HMD 101 or the outsole of a shoe.) In essence, the electric charging may be wireless, wired, or a combination thereof throughout one or more components of, or accessories to, the extended reality synchronization kit 100.

In an alternative embodiment, the one or more sensory feedback devices 203 comprise a vibration mat 351 that extends substantially through the removable smart insole 102. Accordingly, FIG. 3B illustrates a sensory feedback mat 351 positioned within the smart insole 102. In essence, different sections of the sensory feedback mat 351 may have a sensory feedback device 203.

Figure 4A:
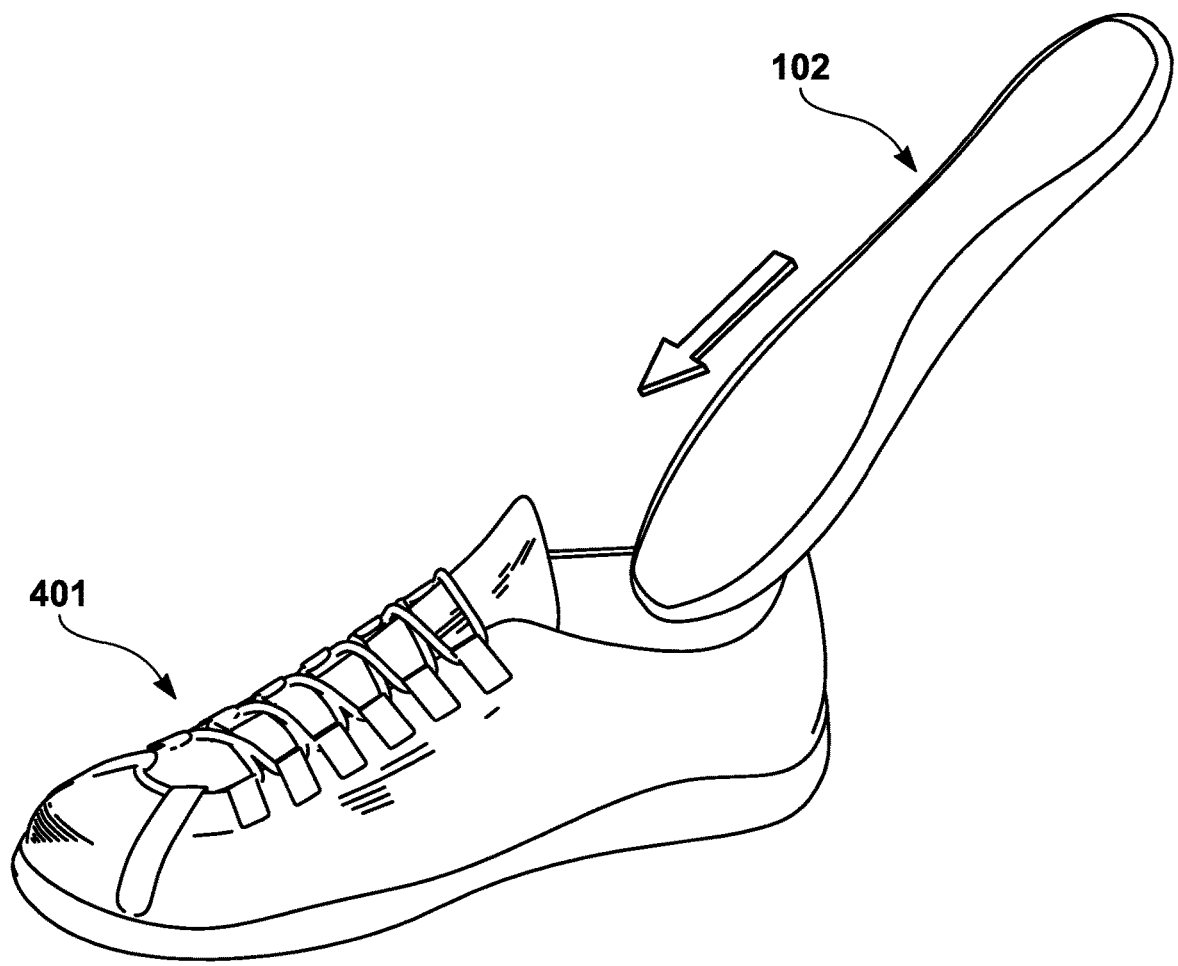
FIG. 4A illustrates a right-fitting smart insole as it is about to be inserted into a right sneaker.
Figure 4B:
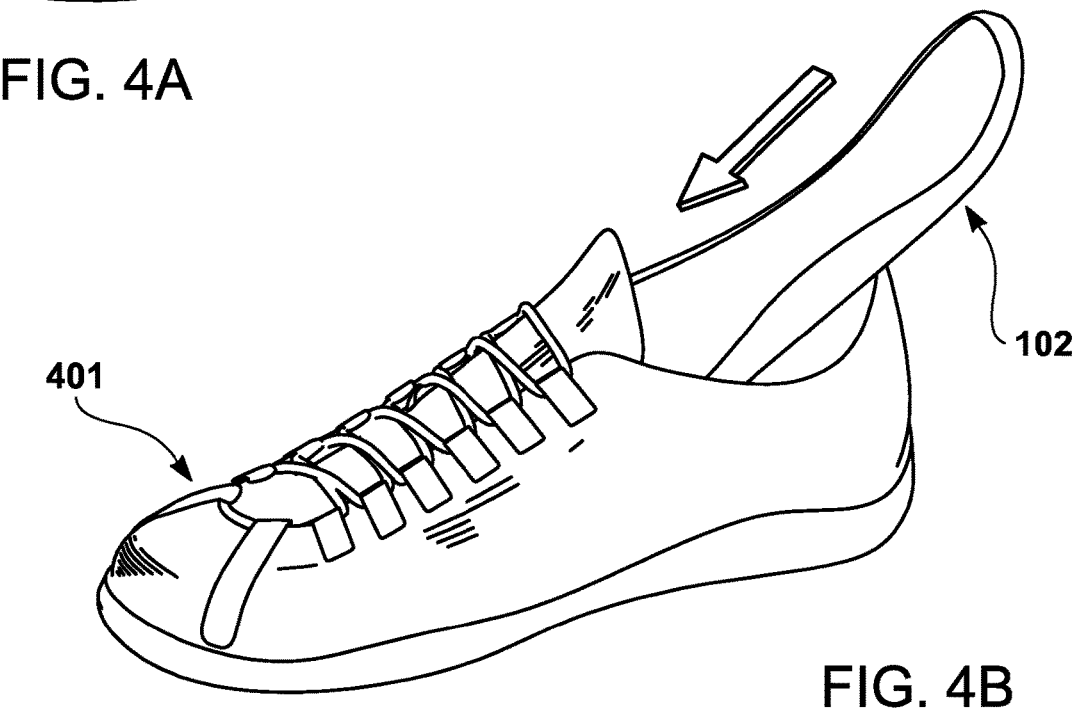
FIG. 4B illustrates the right-fitting smart insole being inserted into a right sneaker.

FIGS. 4A and 4B illustrate an example of the smart insoles 102 being removable for use with sneakers 401. For example, FIG. 4A illustrates a right-fitting smart insole 102 as it is about to be inserted into a right sneaker 401. Furthermore, FIG. 4B illustrates the right-fitting smart insole 102 being inserted into a right sneaker 401.

Figure 5A:
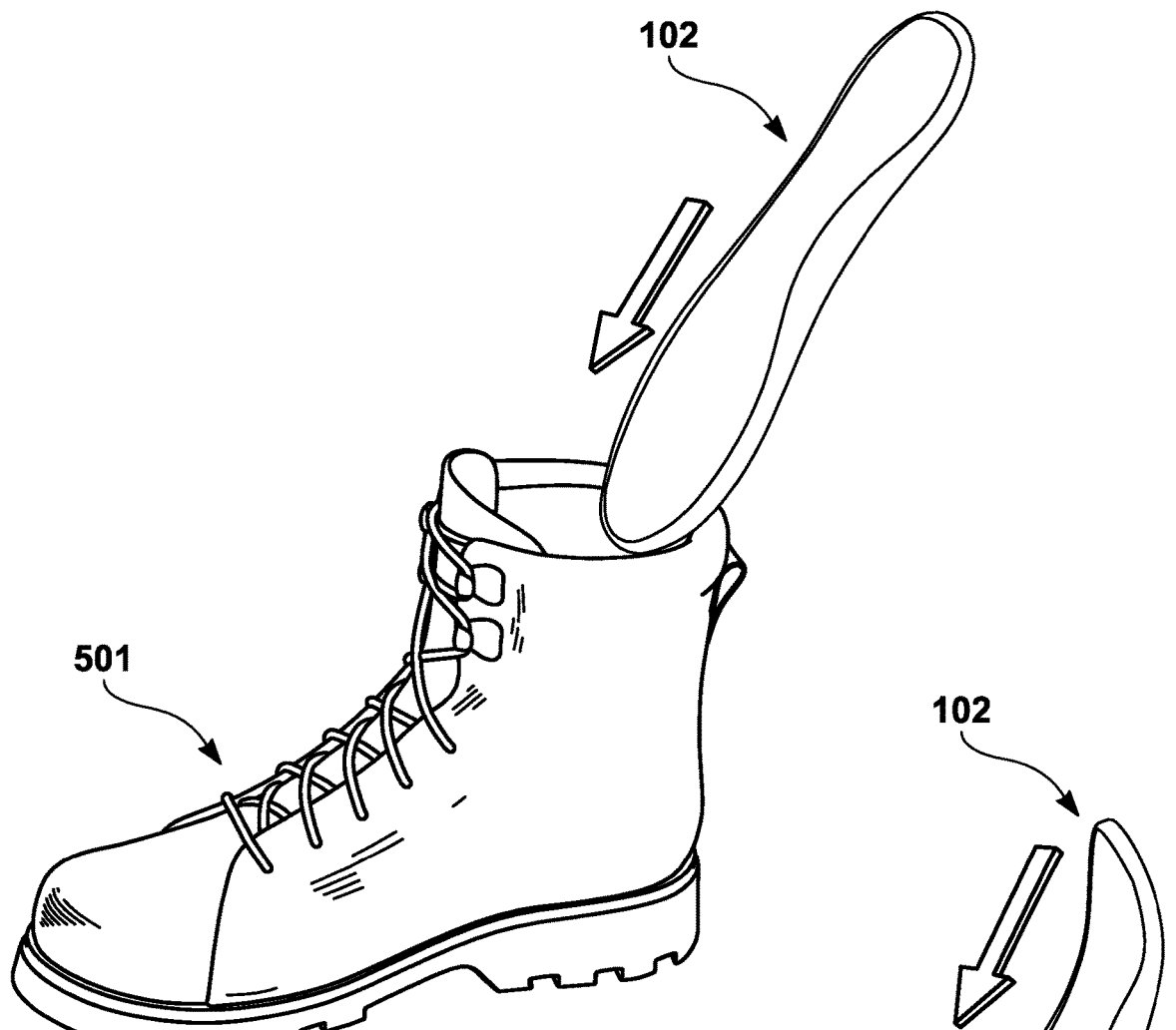
FIG. 5A illustrates the same right-fitting smart insole, which was used with the sneakers illustrated in FIGS. 4A and 4B, as it is about to be inserted into a right boot.
Figure 5B:
FIG. 5B illustrates the right-fitting smart insole being inserted into the right boot.

The example of sneakers 401 is just one example of the versatility of the smart insole 102. FIGS. 5A and 5B illustrates an example in which the smart insoles 102 are removable for use with boots 501. For example, FIG. 5A illustrates the same right-fitting smart insole 102, which was used with the sneakers 401 illustrated in FIGS. 4A and 4B, as it is about to be inserted into a right boot 501. Furthermore, FIG. 5B illustrates the right-fitting smart insole 102 being inserted into the right boot 501.

Figure 6A:
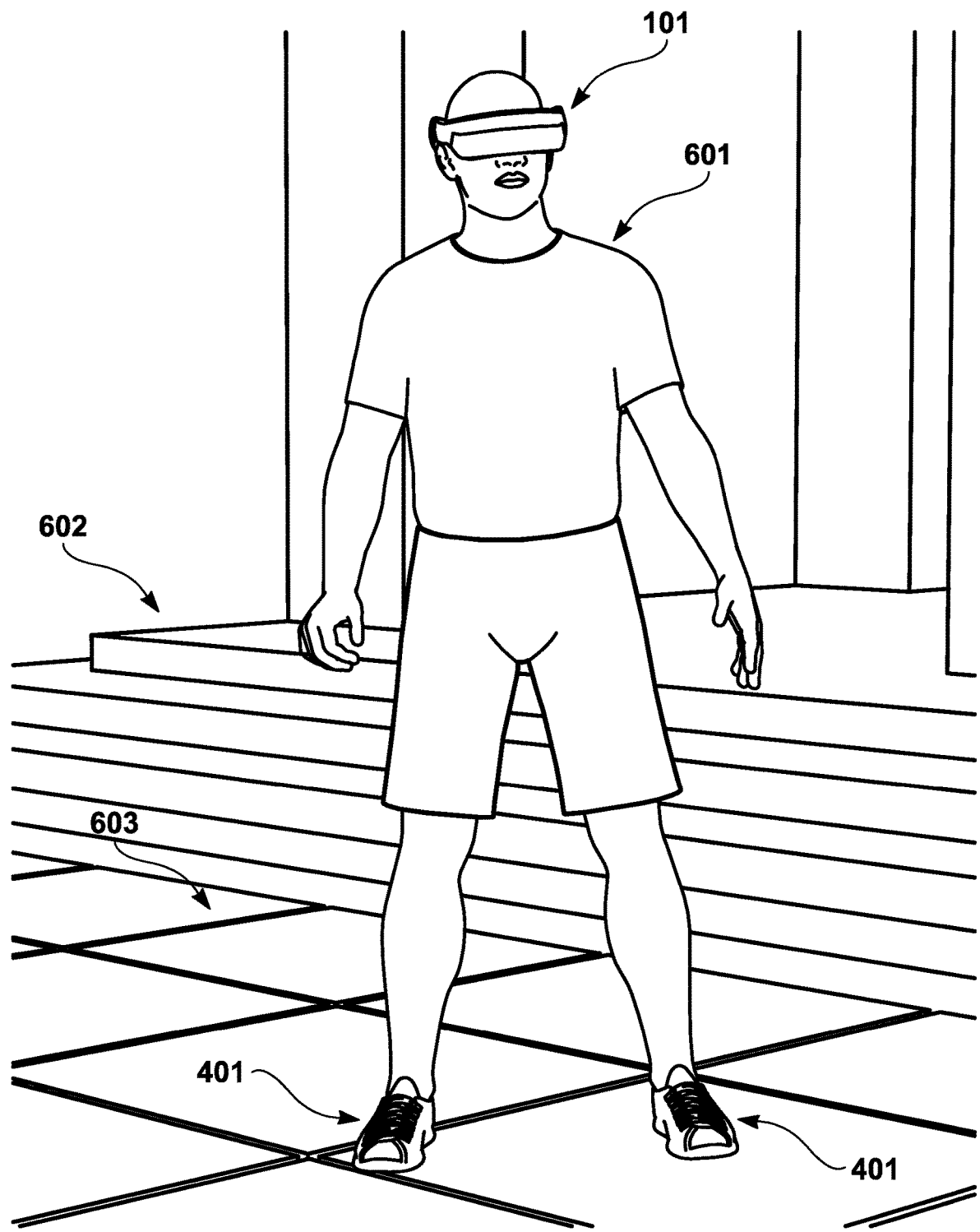
FIG. 6A illustrates a user wearing the HMD and the sneakers (with the smart insoles 102 inserted therein).
Figure 6B:
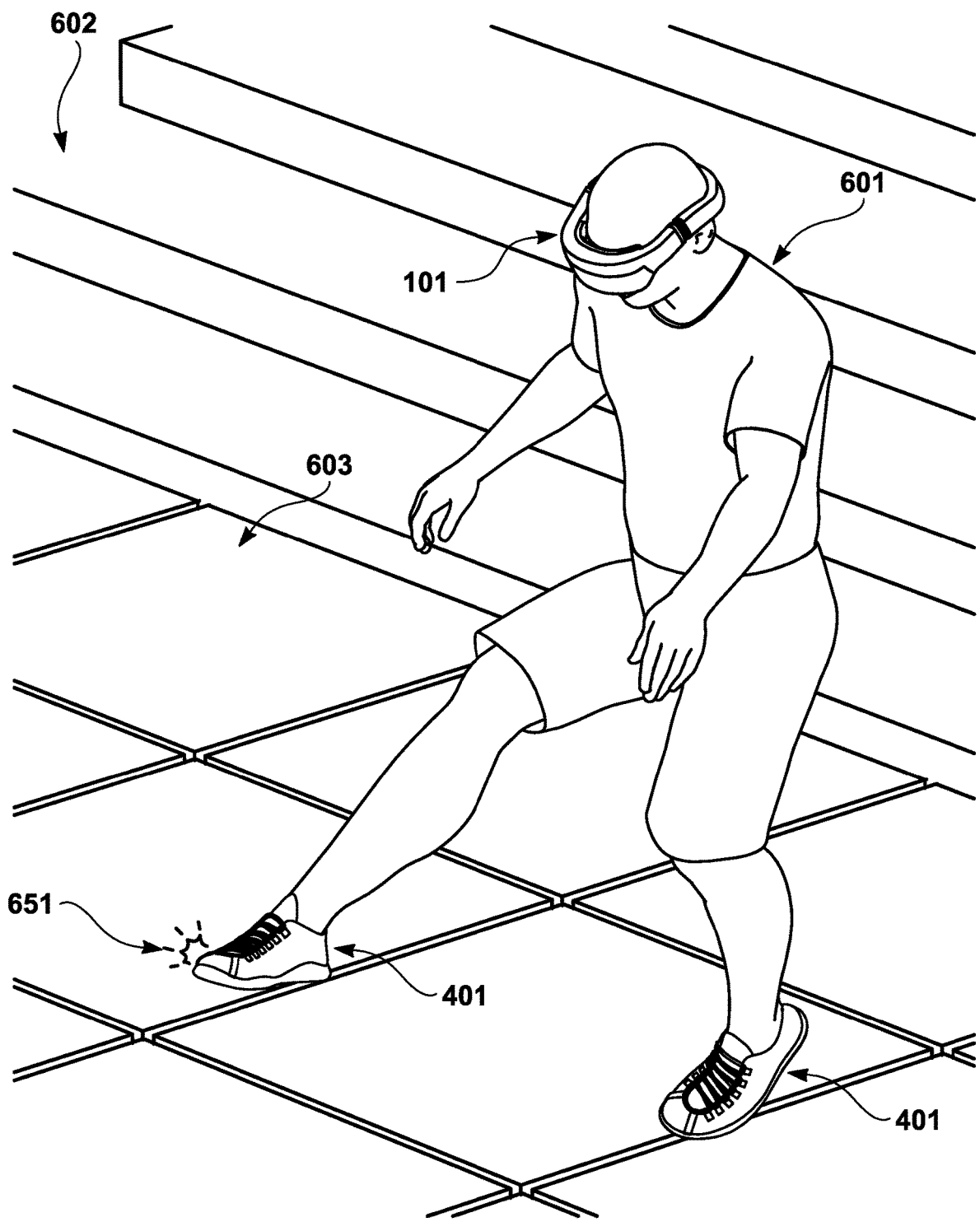
FIG. 6B illustrates a view of the real-world environment as would be observed from an individual other than the user.
Figure 6C:
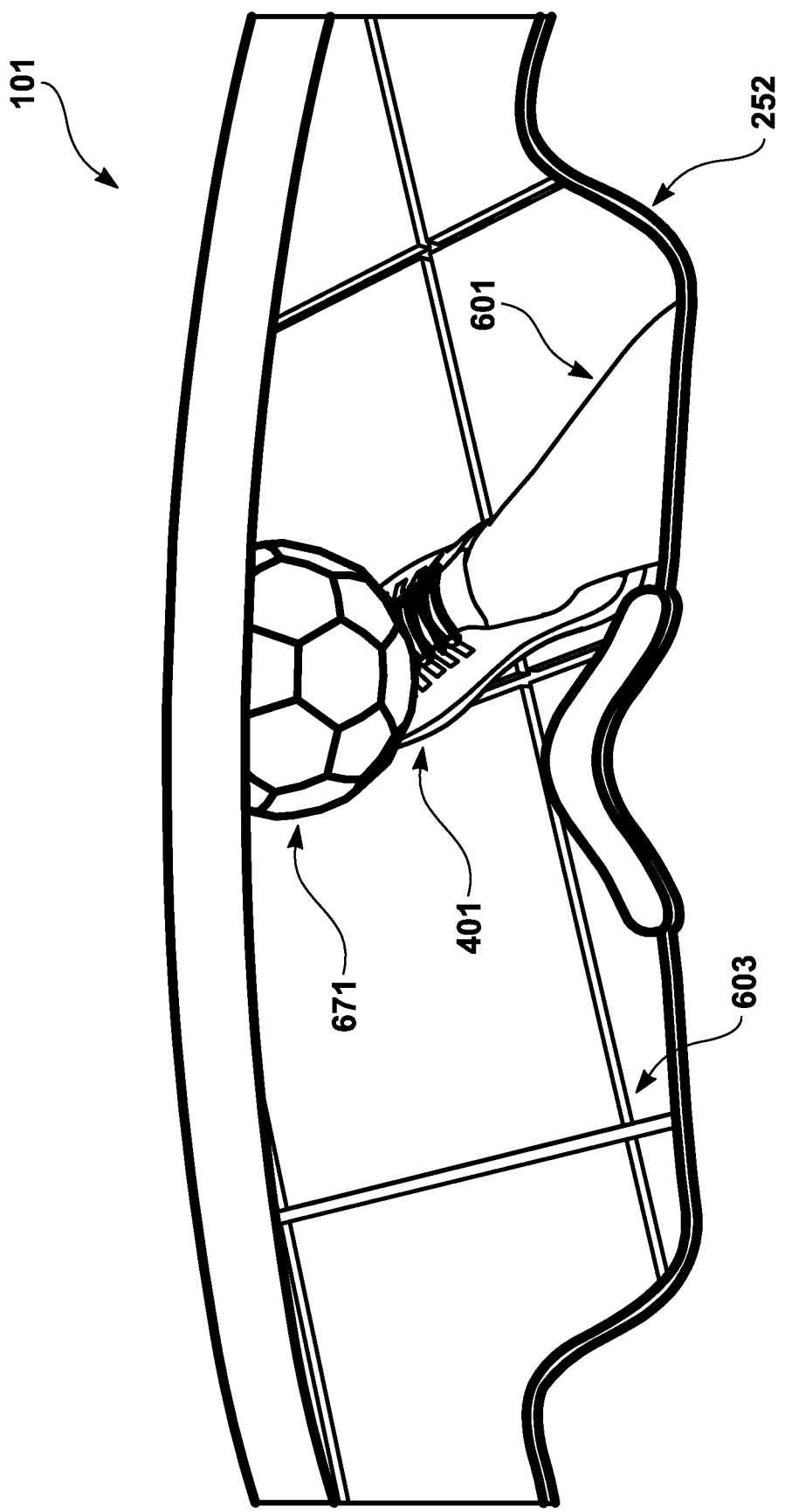
FIG. 6C illustrates the display device of the HMD rendering a virtual feature (e.g., virtual soccer ball) from the perspective of what is observed by the user.

FIGS. 6A-6C illustrate an example of the extended reality synchronization kit 100 being utilized in an extended reality gaming environment such as soccer. In particular, as an example, FIG. 6A illustrates a user 601 wearing the HMD 101 and the sneakers 401 (with the smart insoles 102 inserted therein). The user 601 may be situated in a real-world environment other than on a soccer field (alternatively, the real-world environment may be a soccer field). For example, the user 601 may be situated in an urban environment 602, which may have certain terrain 603 (e.g., cement blocks, sidewalks, potholes, etc.). FIG. 6B illustrates a view of the real-world environment as would be observed from an individual other than the user 601. Although the user 601 appears to be kicking thin air, the user 601 is viewing a virtual soccer ball and attempting to kick that virtual soccer ball. The smart insole 102 (not shown) determines various real-world stimuli (e.g., speed, motion, position, force, etc. exerted by thereon or in proximity thereto) and calculates and transmits real-world motion input to the HMD 101. Furthermore, the HMD 101 may use that real-world motion input in conjunction with a concurrent virtual feature (e.g., display of a virtual ball to be kicked by the user 601) rendered by the HMD 101, which may then transmit an adapted real-world experience via sensory feedback to one or more sensory feedback devices 203 within the smart insole 102. For instance, the real-world position of the smart insole 102 may be correlated with the virtual position of the soccer ball, and a haptic vibration 651 on the outside part of the foot of the user 601 may be emitted. (The haptic vibration 651 is illustrated as just one example of sensory feedback—other forms such as audio emission, light emission, etc. may be used in addition or in the alternative.) As a result, the user 601 may receive real-world sensory feedback that is aligned with a corresponding virtual feature. FIG. 6C illustrates the display device 252 of the HMD 101 rendering a virtual feature 671 (e.g., virtual soccer ball) from the perspective of what is observed by the user 601.

Although FIGS. 6B and 6C illustrate a virtual feature that is rendered by the HMD 101, that feature could instead be a real-world feature. For example, a real-world soccer ball may be viewed by the user 601 via the HMD 101. The HMD 101 may display additional or alternative features that are virtual, such as a virtual soccer net. In this instance, the smart insole 102 may measure additional metrics, such as the force exerted by kicking the real-world soccer ball; such metrics allow the HMD 101 to adapt the virtual experience. For instance, based on the force exerted to kick the real-world soccer ball and a relative position of a virtual soccer net, the HMD 101 can appropriately time a virtual indication of "goal" via the display device 252. Also, the HMD 101 can insert various virtual opponents based on the foot positioning of the user 601. For example, with the real-world or virtual soccer ball, the user 601 may move his or her foot to the right, and the HMD 101 may use that data to insert a virtual opponent within the extended reality experience to place the opponent's foot to block the foot of the user 601; such level of accuracy is not practically feasible without measurements in proximity to the foot of the user 601, as provided for by the extended reality synchronization kit 100. The one or more sensory feedback devices 203 may then be utilized to provide sensory feedback (e.g., a haptic vibration) to the user 601 that the opponent blocked his or her foot—whether the soccer ball is a real-world or virtual soccer ball. In essence, the extended reality synchronization kit 100 ties the virtual world to the real world in a meaningful way that provides an overall immersive experience that cannot be achieved with either in isolation, and without the necessary communication that allows for adaptation of corresponding contexts.

Figure 7A:
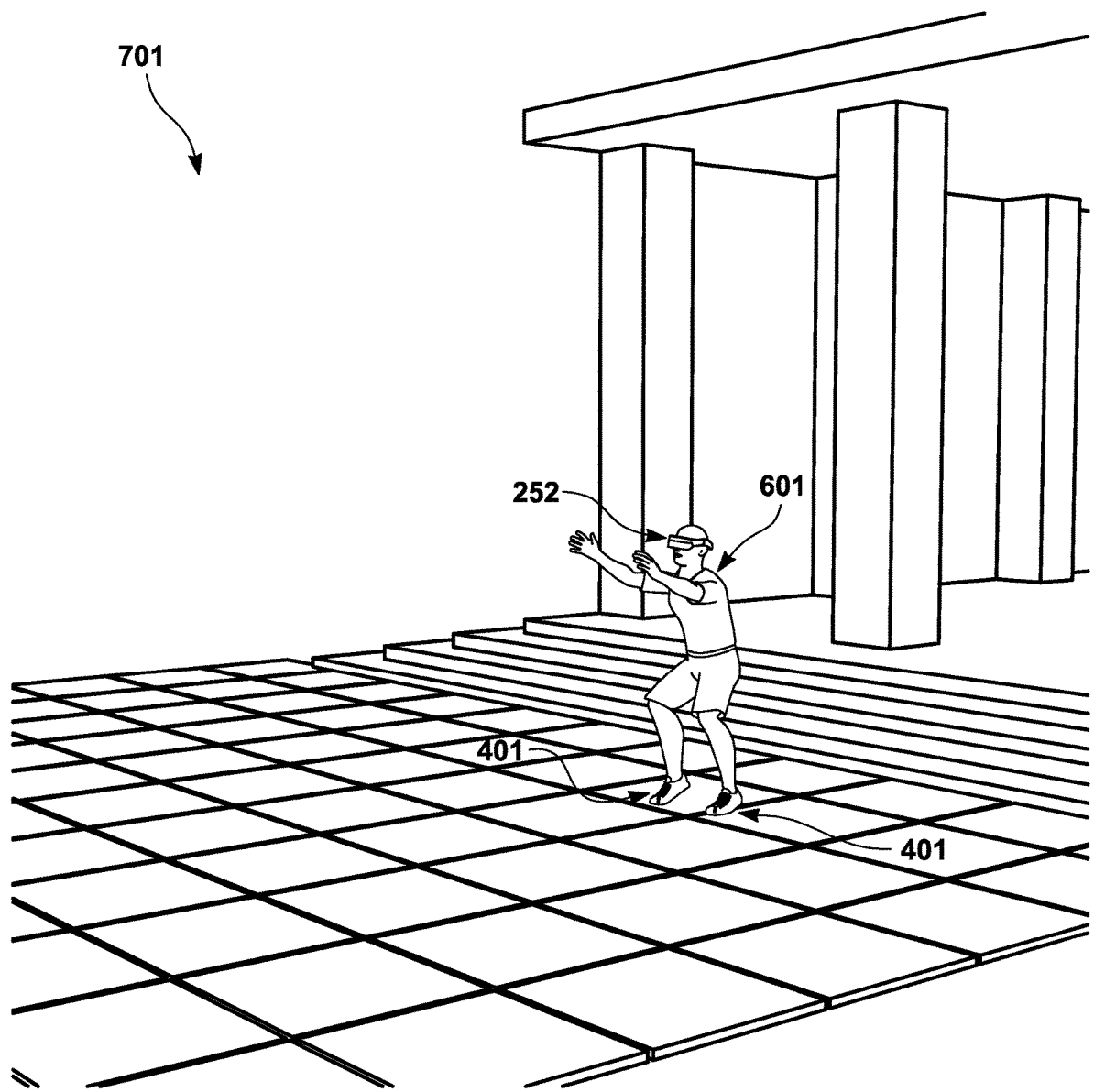
FIG. 7A illustrates the user wearing the HMD and the sneakers (with the smart insoles inserted therein).
Figure 7B:
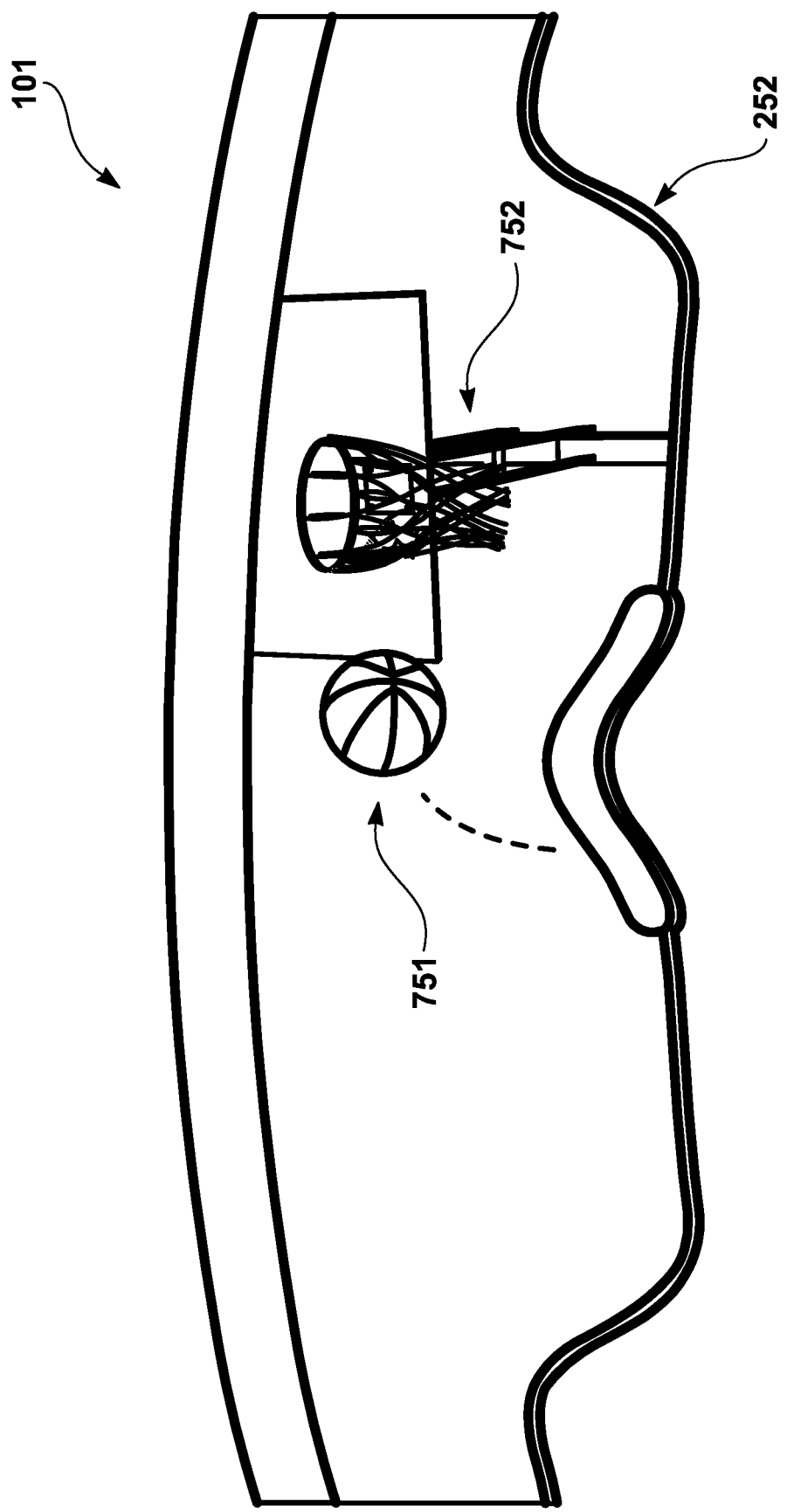
FIG. 7B illustrates a perspective of a real-world wherein the user is playing without a basketball or basketball hoop.

As another example, FIGS. 7A and 7B illustrate an example of the extended reality synchronization kit 100 being utilized in an extended reality gaming environment such as basketball. FIG. 7A illustrates the user 601 wearing the HMD 101 and the sneakers 401 (with the smart insoles 102 inserted therein). The user 601 may be situated in a real-world environment 701 other than on a basketball court. From the perspective of a real-world observer, as illustrated in FIG. 7B, the user 601 is playing without a basketball or basketball hoop. From the perspective of the user 601 using the HMD 101, the user 601 is able to view a virtual basketball 751 being thrown toward a virtual hoop 752. As the user 601 jumps or lands, the user 601 may experience various sensory feedback (i.e., from the force exerted on the smart insole 102 from jumping or landing).

As yet another example, FIG. 8 illustrates the user 601 utilizing the extended reality synchronization kit 100 in a real-world environment 801, such as a real-world basketball court. In this example, the user 601 throws a real basketball 851 toward a real basketball hoop 852. The HMD 101 may insert virtual opponents, and the smart insole 102 may provide various sensory feedback to mimic what the user 601 would have felt during real-world game play. For example, if an opponent makes contact with the user 601 when the user 601 is dribbling the basketball, the smart insole 102 may emit sensory feedback that would halt the real-world progression of the user 601. More specifically, the direction of the force applied to the user 601 may determine which of the sensory feedback devices 203 emits sensory feedback. For example, if an opponent applies a block that leads to rearward motion of the user 601, the sensory feedback device 203 located toward the rear of the smart insole 102 may emit a vibration.

The activities exemplified herein are not intended to be limiting. The extended reality synchronization kit 100 may be utilized for a variety of gaming activities, medical diagnostics and procedures, fitness activities, etc.

Furthermore, although the extended reality synchronization kit 100 may be used for single-user immersive experiences, it may also be used in multi-user immersive experiences as well. In essence, multiple extended reality synchronization kits 100 may communicate with one another to provide for an overall synchronized immersive experience for multiple users. For instance, real-world stimulus sensed by the smart insole 102 of one user may potentially adapt the virtual experience of a different user. This is particularly helpful in the gaming context where multiple players may be participating in a shared gaming experience.

The processes described herein may be implemented in a specialized, multi-purpose or single purpose processor. Such a processor will execute instructions, either at the assembly, compiled or machine-level, to perform the processes. A computer readable storage device may be any device capable of carrying those instructions and include a CD-ROM, DVD, magnetic or other optical disc, tape, silicon memory (e.g., removable, non-removable, volatile or non-volatile, packetized or non-packetized data through wireline or wireless transmissions locally or remotely through a network).

It is understood that the kits, processes, systems, apparatuses, and computer program products described herein may also be applied in other types of kits, processes, systems, apparatuses, and computer program products. Those skilled in the art will appreciate that the various adaptations and modifications of the embodiments of the kits, processes, systems, apparatuses, and computer program products described herein may be configured without departing from the scope and spirit of the present processes and systems. Therefore, it is to be understood that, within the scope of the appended claims, the present processes, systems, apparatuses, and computer program products may be practiced other than as specifically described herein.

We claim:

1. An extended reality apparatus kit comprising:
   an extended reality headset configured to provide an extended reality experience for a user, the extended reality headset comprising:
   a display device adapted to be worn on a head of the user; and
   a headset processor in operable communication with the display device, the headset processor generating virtual data for the extended reality experience; and
   a removable smart insole that is adapted for positioning within a plurality of distinct footwear apparatuses, the removable smart insole comprising:
   one or more sensory feedback devices;
   one or more motion-based sensors;
   a transmitter;
   a receiver configured to directly receive extended reality data associated with the extended reality experience from the extended reality headset in at least substantially real-time; and
   a smart insole processor that (i) determines a real-world stimulus corresponding to the extended reality experience, (ii) calculates one or more motion-based measurements of the removable smart insole, via the one or more motion-based sensors, that substantially coincides with the extended reality experience, (iii) generates a sensory feedback, via the one or more sensory feedback devices, based on the real-world stimulus, (iv) generates a real-world motion input based on the one or more motion-based measurements, and (v) directly transmits, via the transmitter, the real-world motion input to the extended reality headset for an adaptation of the extended reality experience rendered by the extended reality headset,
   wherein the one or more motion-based sensors comprise a differential encoder and a position sensor, the differential encoder measuring differentiated velocity data of the removable smart insole, the position sensor measuring a position of the removable smart insole.

2. The extended reality apparatus kit of claim 1, wherein the removable smart insole further comprises an integrated rechargeable power assembly that is at least partially recharged by electrical energy generated from force, applied to the removable smart insole, that is converted to the electrical energy.

3. The extended reality apparatus kit of claim 1, wherein the one or more sensory feedback devices comprise a plurality of haptic vibration devices each positioned at a different portion of the removable smart insole to emit a vibration at a corresponding part of a foot of the user based on the real-world stimulus.

4. The extended reality apparatus kit of claim 1, wherein the one or more sensory feedback devices comprise a vibration mat that extends substantially through the removable smart insole, the vibration mat comprising a plurality of haptic vibration devices each positioned at a different portion of the vibration mat to emit a vibration at a corresponding part of a foot of the user based on the real-world stimulus.

5. The extended reality apparatus kit of claim 1, wherein the one or more sensory feedback devices comprise one or more audio emission devices that emit audio at corresponding portions of a foot of the user associated with real-world stimulus.

6. The extended reality apparatus kit of claim 1, wherein the one or more motion-based sensors comprise an inertial measurement unit selected from the group consisting of: an accelerometer and a gyroscope.

7. The extended reality apparatus kit of claim 1, wherein the one or more motion-based sensors comprise a strain gauge.

8. An extended reality apparatus kit comprising:
   an extended reality headset configured to provide an extended reality experience for a user, the extended reality headset comprising:
   a display device adapted to be worn on a head of the user; and
   a headset processor in operable communication with the display device, the headset processor generating virtual data for the extended reality experience; and
   a removable smart insole that is adapted for positioning within a plurality of distinct footwear apparatuses, the removable smart insole comprising:
   one or more sensory feedback devices;
   one or more motion-based sensors;
   a transmitter;

a receiver configured to directly receive extended reality data associated with the extended reality experience from the extended reality headset in at least substantially real-time; and a smart insole processor that (i) determines a real-world stimulus corresponding to the extended reality experience, (ii) calculates one or more motion-based measurements of the removable smart insole, via the one or more motion-based sensors, that substantially coincides with the extended reality experience, and (iii) generates a sensory feedback, via the one or more sensory feedback devices, based on the real-world stimulus, wherein the one or more motion-based sensors comprise a differential encoder and a position sensor, the differential encoder measuring differentiated velocity data of the removable smart insole, the position sensor measuring a position of the removable smart insole.

9. The extended reality apparatus kit of claim 8, wherein the removable smart insole further comprises an integrated rechargeable power assembly that is at least partially recharged by electrical energy generated from force, applied to the removable smart insole, that is converted to the electrical energy.

10. The extended reality apparatus kit of claim 8, wherein the one or more sensory feedback devices comprise a plurality of haptic vibration devices each positioned at a different portion of the removable smart insole to emit a vibration at a corresponding part of a foot of the user based on the real-world stimulus.

11. The extended reality apparatus kit of claim 8, wherein the one or more sensory feedback devices comprise a vibration mat that extends substantially through the removable smart insole, the vibration mat comprising a plurality of haptic vibration devices each positioned at a different portion of the vibration mat to emit a vibration at a corresponding part of a foot of the user based on the real-world stimulus.

12. The extended reality apparatus kit of claim 8, wherein the one or more sensory feedback devices comprise one or more audio emission devices that emit audio at corresponding portions of a foot of the user associated with real-world stimulus.

13. The extended reality apparatus kit of claim 8, wherein the one or more motion-based sensors comprise an inertial measurement unit selected from the group consisting of: an accelerometer and a gyroscope.

14. The extended reality apparatus kit of claim 8, wherein the one or more motion-based sensors comprise a strain gauge.

15. An extended reality apparatus kit comprising:

an extended reality headset configured to provide an extended reality experience for a user, the extended reality headset comprising:

a display device adapted to be worn on a head of the user; and a headset processor in operable communication with the display device, the headset processor generating virtual data for the extended reality experience; and a removable smart insole that is adapted for positioning within a plurality of distinct footwear apparatuses, the removable smart insole comprising:

one or more sensory feedback devices;

one or more motion-based sensors;

a transmitter;

a receiver configured to directly receive extended reality data associated with the extended reality experience from the extended reality headset in at least substantially real-time; and a smart insole processor that (i) calculates one or more motion-based measurements of the removable smart insole, via the one or more motion-based sensors, that substantially coincides with the extended reality experience, (ii) generates a real-world motion input based on the one or more motion-based measurements, and (iii) directly transmits, via the transmitter, the real-world motion input to the extended reality headset for an adaptation of the extended reality experience rendered by the extended reality headset, wherein the one or more motion-based sensors comprise a differential encoder and a position sensor, the differential encoder measuring differentiated velocity data of the removable smart insole, the position sensor measuring a position of the removable smart insole.

16. The extended reality apparatus kit of claim 15, wherein the removable smart insole further comprises an integrated rechargeable power assembly that is at least partially recharged by electrical energy generated from force, applied to the removable smart insole, that is converted to the electrical energy.

17. The extended reality apparatus kit of claim 15, wherein the one or more sensory feedback devices comprise a plurality of haptic vibration devices each positioned at a different portion of the removable smart insole to emit a vibration at a corresponding part of a foot of the user based on a real-world stimulus.

18. The extended reality apparatus kit of claim 15, wherein the one or more sensory feedback devices comprise a vibration mat that extends substantially through the removable smart insole, the vibration mat comprising a plurality of haptic vibration devices each positioned at a different portion of the vibration mat to emit a vibration at a corresponding part of a foot of the user based on a real-world stimulus.

* * * * *